United States Patent
Lundstrom

[15] 3,684,952

[45] Aug. 15, 1972

[54] APPARATUS FOR MEASURING DIELECTRIC CONSTANT

[72] Inventor: John W. Lundstrom, Glendora, Calif.

[73] Assignee: Moisture Register Company, Alhambra, Calif.

[22] Filed: April 7, 1970

[21] Appl. No.: 26,244

[52] U.S. Cl. .......................... 324/61 QS, 324/58.5 A
[51] Int. Cl. ........................ G01r 27/26, G01r 27/04
[58] Field of Search ..................... 324/58.5, 58.5 A, 58.5 B, 58.5 C, 324/61 TI

[56] References Cited

UNITED STATES PATENTS 3,550,106   12/1970   Gehman ................... 331/65 X

FOREIGN PATENTS OR APPLICATIONS 991,795    5/1965    Great Britain ............ 324/58.5
1,082,872  9/1967    Great Britain .......... 324/61 TI
349,102    9/1960    Switzerland ............ 324/61 TI Primary Examiner—Alfred E. Smith
Attorney—Forrest J. Lilly

[57] ABSTRACT

A very high frequency oscillator has an antenna as the frequency determining element. The antenna is immersed in a material having a high ionic conductivity, and the shift in the frequency of the oscillator is measured. The frequency shift is indicative of the dielectric constant and moisture content of the material. A dielectric may be interposed between the antenna and the material to reduce the range of frequency shift of the oscillator.

2 Claims, 3 Drawing Figures

PATENTED AUG 15 1972 3,684,952
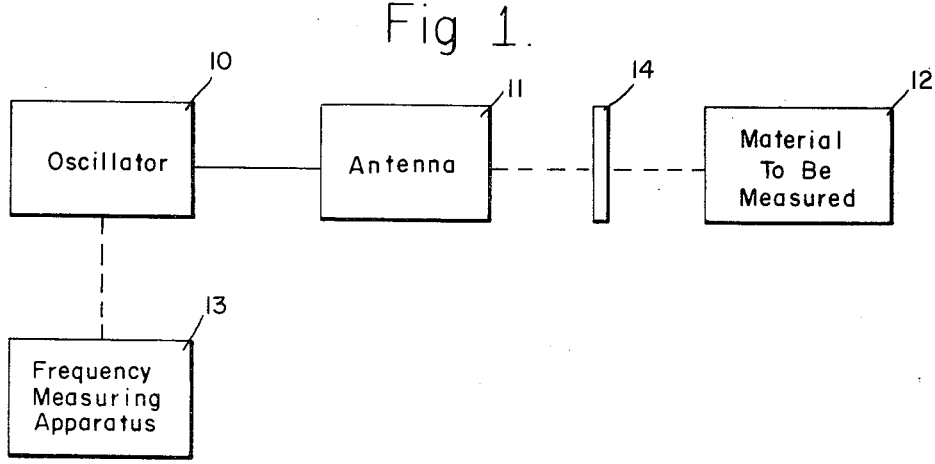
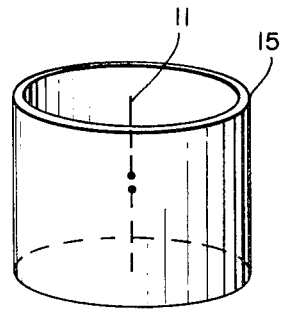
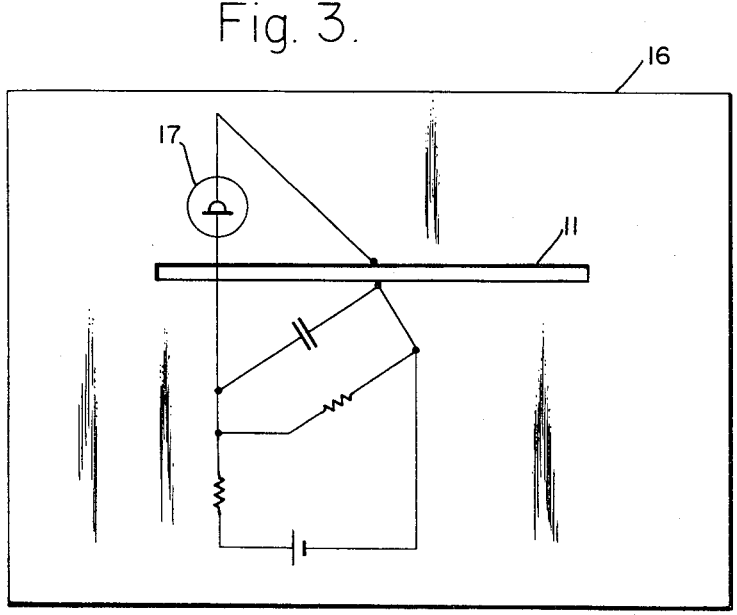
John W. Lundstrom,
INVENTOR.
BY.
ATTORNEY

APPARATUS FOR MEASURING DIELECTRIC CONSTANT

BACKGROUND OF THE INVENTION

This invention relates generally to measurement of dielectric constant and, more particularly, to the measurement of moisture content of materials having a high ionic conductivity.

A common method widely used in the measurement of moisture content in materials is the determination of dielectric constant. These dielectric constant measurements generally are made at audio frequencies or medium to high radio frequencies, and either employ a balanced bridge or a frequency shifted oscillator as a basic measurement circuit.

There exists a large class of materials containing high moisture contents and varying amounts of substances which create a high dielectric power loss in these materials. In fact, many materials exhibit such a high conductance to the measuring circuit resulting from high material temperature, high ionic conductivity and/or high moisture content, so as to render impossible the measurement of dielectric constant by conventional means.

Materials exhibiting high ionic conductivity at lower frequencies tend to exhibit a reduced ionic conductivity as the frequency is increased. However, as the measurement frequency is increased, conventional measuring circuits become less useful. A bridge type of measuring circuit becomes extremely difficult to balance because stray capacities are so evident. Use of the usual frequency shifted oscillator techniques require rather small samples to keep the capacitance value of the sample loaded capacitor small, to afford proper resonant circuits at higher frequencies. Coupling of the measuring oscillator to the sample becomes quite difficult due to inductances created in the lead lengths required. Transmission line techniques are not particularly useful in coupling to the electrode due to the change in oscillator frequency. Also, in the application of these techniques, the remaining component of loss tends to reduce the resonant tank circuit Q to values which often render the tank circuit ineffective in determining oscillator frequency, and stray capacitance and lead lengths form higher Q tank circuits resulting in oscillation at other than desired frequencies.

OBJECTS OF THE INVENTION

Accordingly, it is an object of the invention to provide a novel method of measuring dielectric constant and moisture content of materials having a high dielectric power loss due to high ionic conductivity.

Another object of the invention is the provision of novel apparatus for measuring dielectric constant and moisture content of materials having a high dielectric power loss due to high ionic conductivity.

Yet another object of the invention is to provide apparatus for measuring dielectric constant which operates in the very high frequency range.

SUMMARY OF THE INVENTION

In accordance with these and other objects of the invention, there is provided a very high frequency oscillator employing an antenna as the frequency determining element or tank circuit. The antenna is immersed in the material to be measured causing a shift in the oscillator frequency. This frequency shift is measured, and is indicative of the dielectric constant and moisture content of the material.

BRIEF DESCRIPTION OF THE DRAWINGS

The following specification and the accompanying drawings describe and illustrate exemplary embodiments of the present invention. Consideration of the specification and the drawings will provide an understanding of the invention, including the novel features and objects thereof. Like reference characters denote like parts throughout the figures of the drawings.

FIG. 1 is a diagram of an embodiment of apparatus for measuring dielectric constant in accordance with the invention;

FIG. 2 is a perspective view of one form of antenna arrangement for the apparatus of FIG. 1;

FIG. 3 is a diagram of another form of antenna arrangement and associated oscillator circuit for the apparatus of FIG. 1 and FIG. 4 is a pictorial, perspective view of the antenna arrangement of FIG. 3 incorporating a conducting cavity.

DESCRIPTION OF THE INVENTION

Referring now to FIG. 1, there is illustrated apparatus for measuring dielectric constant constructed in accordance with the present invention. An oscillator 10 is coupled to an antenna 11 which serves as the frequency-determining element or tank circuit thereof. The parameters of the oscillator 10 and antenna 11 are selected or adjusted so that the oscillator 10 oscillates at a frequency in the VHF region, that is, a frequency between 100 and 300 MHZ. The material 12 whose dielectric constant is to be measured is coupled to the antenna 11 and causes the frequency of the oscillator 10 to change. Frequency measuring apparatus 13 is coupled to the oscillator 10 for measuring changes in the frequency thereof, and thereby indicate the dielectric constant of the material 12. A piece of dielectric material 14 may be interposed between the antenna 11 and the material 12 to be measured to vary the sensitivity of frequency shift versus dielectric constant changes.

The antenna 11 may be any one of several different types, for example, a halfwave dipole antenna. The resonant frequency of a halfwave dipole antenna is inversely proportional to the square root of the relative dielectric constant of the medium in which the antenna is immersed. Thus, a halfwave dipole antenna of fixed length exhibits a reduction of resonant frequency as the relative dielectric constant of the media in which it is immersed is increased. Since the antenna 11 is employed as the frequency determining element or tank circuit of the oscillator 10, the frequency of the oscillator 10 is inversely proportional to the square root of the relative dielectric constant of the substance in which it is immersed.

FIG. 2 shows the antenna 11 placed coaxially in a cylindrical container 15 having a diameter of at least a half wavelength. The material 12 to be measured is placed in the container 15 and surrounds the antenna 11. The material 12 to be measured may be any wet material having a high ionic conductivity such as wet-spent grain or bauxite ore. The shift in frequency of the oscillator 10 when the material 12 is placed in the container 15 is indicative of the relative dielectric constant of the material 12. Furthermore, the shift in frequency of the oscillator 10 is also indicative of the moisture content of the material 12. Water has a relative dielectric constant of about 80 and when it is added to materials with relative dielectric constants of 5 to 10 the water causes a substantial increase in the dielectric constant of the base material.

Because the measurement is made in the VHF frequency range, the dielectric power loss, high conductance, high ionic conductivity or high moisture content do not render measurement impossible as happens when the measurement is made by conventional means. Materials exhibiting high ionic conductivity at lower frequencies tend to exhibit a reduced ionic conductivity as frequency is increased. Several orders of magnitude in the reduction of dielectric power loss is often obtained by employing measuring frequencies in the VHF region. Apparently the transfer of ions cannot take place at these frequencies at a rate to substantially increase the dielectric power loss. Furthermore, temperature variations in the dielectric power loss factor resulting from high ionic conductivity occurring at lower frequencies are substantially reduced by making the measurement in the VHF frequency region.

The frequency measuring apparatus 13 for determining the frequency shift of the oscillator 10 may take any one of several different forms. The frequency measuring apparatus 13 may be a VHF receiver tuned to the frequency of the oscillator 10 before and after loading the antenna 11 with the material 12 to be measured. The frequency measuring apparatus 13 may also be apparatus for making a direct frequency measurement employing frequency division and pulse counting, or it may be frequency comparison apparatus which compares the oscillator 10 to a fixed local oscillator.

By using the antenna 11 as the frequency determining element of the oscillator 10, the problem of trying to balance a bridge type instrument at VHF frequencies is eliminated. Furthermore, the problems of capacitor size, lead length, and stray capacitance and inductance are eliminated. The size of the sample of the material 12 to be measured can be larger, and is approximately a half wavelength long and a quarter to a third of a wavelength in diameter. Relatively large frequency shifts are practical with this apparatus, rendering the stability considerations of the measuring circuitry less critical.

When measuring materials with a high power loss, it may be found that the half wave dipole is not entirely satisfactory. The feed point impedance of a halfwave dipole in free space is approximately 72 ohms. In a lossy dielectric medium the feed point impedance is reduced as a function of the loss factor and dielectric constant. The negative resistance of the active element of the oscillator 10 must be substantially lower than the load provided by the antenna 11. This may be difficult to achieve with conventional oscillating devices when measuring materials with a high power loss.

This problem may be overcome in many cases by using a folded dipole antenna, whose impedance is about 300 ohms in free space. Hence, the impedance presented to the terminals of the oscillating device is about four times that of a halfwave dipole under the same material loading conditions.

FIG. 3 shows a slot type antenna 11 which is even better suited to measuring materials with a high power loss. The slot antenna 11 is disposed in a conducting plane 16, and the slot is a half wavelength long and one-twentieth to one one-hundreth of a wavelength wide. The driving impedance at the midpoint of the slot is about 363 ohms and approximately doubles when one side of the conducting plane is enclosed in a conducting cavity to prevent radiation from the slot on that side of the plane. A pictorial view of a slot antenna with one side of the conducting plane 18 enclosed in a conducting cavity 19, as shown in FIG. 4. A slot antenna radiating from one side of a plane sheet will present a free space impedance of about 700 to 900 ohms. This value of load is well adapted for us with conventional two terminal oscillating devices exhibiting negative impedance at the load terminals, especially when loaded with materials of high loss factor.

The oscillator 10 may be any active device exhibiting sufficiently low negative resistance and small reactive components at its two load terminals. The tunnel diode oscillator is particularly well suited for use with the slot antenna, and FIG. 3 illustrates a tunnel diode 17 and its associated circuitry (which is conventional) coupled to the slot antenna 11. The oscillation frequency is dependent on the internal capacitance of the 17, the dimensions of the slot antenna 11, and the dielectric material 12 in proximity to the radiating face of the slot antenna 11. The size of the sample of the material 12 to be measured depends on the penetration of the radiated energy, and is approximately a half wavelength long and a quarter wavelength in all directions perpendicular to the slot axis. Wavelength in all cases is the wavelength either in free space or in the dielectric material 12 loading the antenna 11. The wavelength is directly related to the slot dimensions since frequency is the variable with material dielectric constant changes.

To reduce the frequency shift of the oscillator 10 to be within the range of the frequency measuring apparatus 13, pieces of dielectric material 14 may be inserted between the material 12 to be measured and the antenna 11. For slot lengths of about 12 inches and oscillating frequencies of about 170 MHZ, it will be found that pieces of fiberglass impregnated with epoxy resin, or Teflon, from one-sixteenth to one-half inch thick will be satisfactory for reducing the frequency shift.

Apparatus in accordance with the present invention was constructed to operate at a frequency in air of approximately 190 MHZ and the dielectric constant, and therefore moisture content, of wet-spent grain was measured. It was found that when the moisture content by wet weight of the wet-spent grain was varied from approximately 25 percent to approximately 50 percent, the frequency shifted approximately 25 MHZ.

Although several variations in the practice of the invention have been shown and described, other variations may be made and it is intended that the foregoing disclosure shall be considered only as an illustration of the principles of the invention and not construed in a limiting sense.

What is claimed is:

1. Apparatus for providing an indication of moisture content of material having a high ionic conductivity comprising:

a conducting plane having a slot therein forming a very high frequency antenna, one side of said conducting plane being enclosed in a conducting cavity to prevent radiation from said slot on that side of said conducting plane;

oscillating means having a low negative resistance coupled to said slot in said conducting plane, with said slot forming the frequency determining element for said oscillating means, said oscillating means oscillating in the range between 100 and 300 megahertz;

frequency measuring means coupled to said oscillating means for indicating shifts in frequency thereof;

said conducting plane being adapted for immersion of the slot therein in material having a high ionic conductivity for causing a shift in the frequency of said oscillating means indicative of the moisture content of the material.

2. The method of measuring the moisture content of material having a high ionic conductivity with an oscillator having an antenna as the frequency determining element thereof, the method comprising the following steps:

adjusting the oscillator to oscillate in the range of between 100 and 300 megahertz;

measuring the frequency of the oscillator with the antenna in air;

immersing the antenna in material having a high ionic conductivity;

measuring the frequency of the oscillator with the antenna immersed in the material; and determining the frequency shift between the two frequency measurements.

* * * * *